United States Patent [19]

Takahashi

[11] Patent Number: 4,466,300
[45] Date of Patent: Aug. 21, 1984

[54] SPEEDOMETER DRIVE GEAR ARRANGEMENT IN TRANSAXLE

[75] Inventor: Kotei Takahashi, Yokohama, Japan

[73] Assignee: Nissan Motor Company, Limited, Yokohama, Japan

[21] Appl. No.: 350,386

[22] Filed: Feb. 19, 1982

[30] Foreign Application Priority Data

Feb. 20, 1981 [JP] Japan .................................. 56-22886

[51] Int. Cl.³ ........................ F16H 37/00; F16H 1/38; G01P 3/00; B21D 53/28
[52] U.S. Cl. ......................................... 74/12; 74/710; 74/441; 74/425; 73/527; 29/159.2; 29/434
[58] Field of Search ............... 74/12, 713, 710, 710.5, 74/711, DIG. 10, 446, 447, 434, 458, 409, 410, 694; 73/527; 192/98; 180/255; 464/52, 53, 183, 57; 29/159.2, 229, 434

[56] References Cited

U.S. PATENT DOCUMENTS

| | | | |
|---|---|---|---|
| 1,524,151 | 1/1925 | Rhoads | 74/12 |
| 1,683,036 | 9/1928 | Hughes | 74/12 |
| 1,806,541 | 5/1931 | Gustafson | 74/12 |
| 2,605,121 | 7/1952 | Ensinger | 237/53 |
| 2,793,532 | 5/1957 | Johnson et al. | 74/12 |
| 3,176,534 | 4/1965 | Rice et al. | 74/458 X |
| 3,781,036 | 12/1973 | Brilando | 74/12 X |
| 3,871,235 | 3/1975 | Anderson | 73/510 |
| 4,026,398 | 5/1977 | Matyslchik et al. | 198/92 |
| 4,214,568 | 7/1980 | Ito et al. | 123/198 |

FOREIGN PATENT DOCUMENTS

| | | | |
|---|---|---|---|
| 13923 | 2/1911 | France | . |
| 53-65749 | 11/1978 | Japan | 74/713 |

Primary Examiner—Allan D. Herrmann
Assistant Examiner—Stephen B. Andrews
Attorney, Agent, or Firm—Lowe King Price & Becker

[57] ABSTRACT

A speedometer drive worm gear has at one axial end thereof an inward flange of the thickness considerably smaller than the overall thickness of the worm gear. The speedometer drive worm gear is mounted on a differential case and held axially in place by abuttingly engaging the opposed side surfaces of the inward flange with a shoulder formed in the differential case and the inner race of a differential case bearing by way of a stopper.

10 Claims, 6 Drawing Figures

SPEEDOMETER DRIVE GEAR ARRANGEMENT IN TRANSAXLE

BACKGROUND OF THE INVENTION

1. Field of the Invention

The present invention relates in general to automotive speedometer drive gearing within a transaxle and more particularly to the speedometer drive gear arrangement thereof.

2. Description of the Prior Art

FIG. 5 shows a prior art speedometer drive gear arrangement of the kind wherein a worm gear made of a synthetic resinous or plastic material is used as a take-off gear for driving an automotive speedometer.

Referring to FIG. 5, a plastic worm gear 22' of the overall thickness A' is mounted on a differential case 18' and fixedly attached thereto by being clamped at axial end faces 22'c and 22'd between the shoulder 18'b in the differential case 18' and the inner race of a bearing 24'.

The prior art speedometer drive gear arrangement of the above described kind has the disadvantage that the worm gear 22' tends to be distorted or become loose when the temperature of the worm gear varies due to the fairly large difference in thermal expansion or contraction coefficient between the plastic material forming the worm gear 22' and the iron or steel forming the differential case 18' causing troubles in operation of the speedometer.

SUMMARY OF THE INVENTION

In accordance with the present invention, there is provided a novel and improved speedometer drive gear arrangement which comprises a plastic worm gear mounted on a drive component of a transaxle. The drive component and worm gear are interlocked in such a manner that the worm gear is axially movable but against rotation relative to the drive component. The worm gear has an inward flange of the thickness smaller than the overall thickness of the worm gear and held axially in place by engaging said inward flange at the opposed side surfaces thereof with the drive component.

The above structure is quite effective for preventing the worm gear from the foregoing "distortion" or "looseness" and eliminating the troubles in operation of the speedometer otherwise resulting therefrom.

It is accordingly an object of the present invention to provide a novel and improved speedometer drive gear arrangement in a transaxle which enables a plastic speedometer drive worm gear to be assuredly held in place on a drive component of a transaxle irrespectively of the variations of the temperature of the worm gear.

It is another object of the present invention to provide a novel and improved speedometer drive gear arrangement of the above mentioned character which enables to eliminate the troubles in operation of the speedometer drive gearing otherwise possibly resulting from the variations of the temperature of the gearing.

It is a further object of the present invention to provide a novel and improved speedometer drive gear arrangement of the above mentioned character which is particularly suited for adoption to transaxles for front wheel drive automotive vehicles.

BRIEF DESCRIPTION OF THE DRAWINGS

The features and advantages of the speedometer drive gear arrangement according to the present invention will become more clearly appreciated from the following description taken in conjunction with the accompanying drawings, in which.

DESCRIPTION OF THE PREFERRED EMBODIMENT

Figure 1:
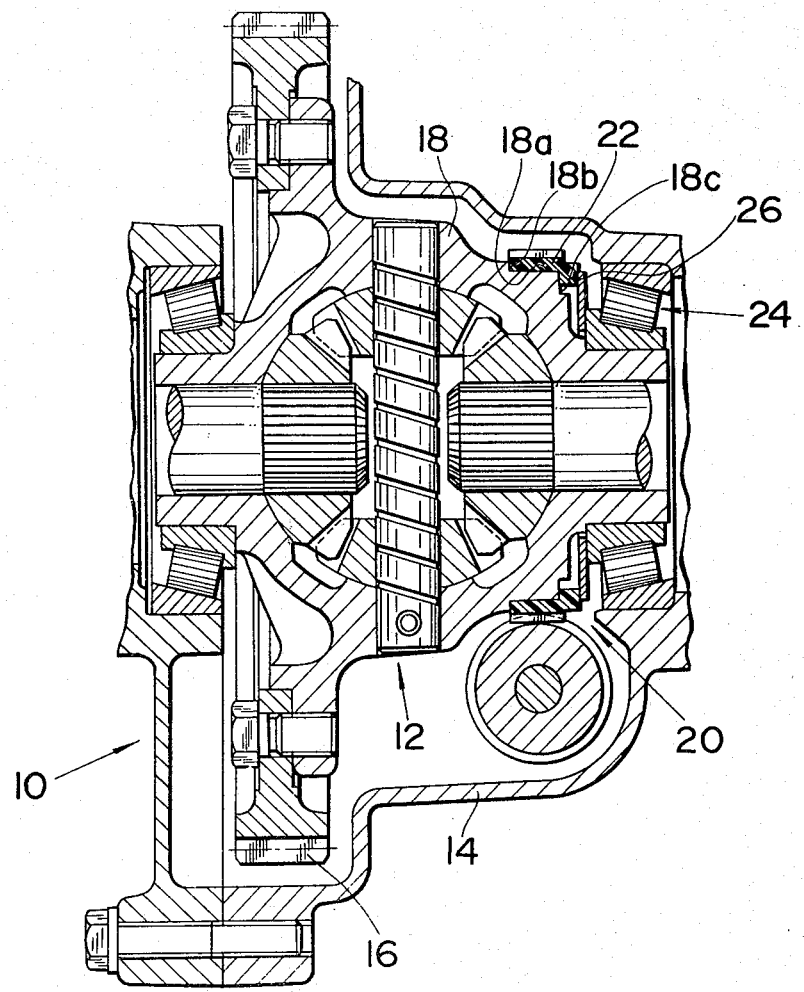
FIGS. 1 and 2 are sectional views taken along different sectional planes but show a speedometer drive gear arrangement of the present invention incorporated in a transaxle differential mechanism.
Figure 2:
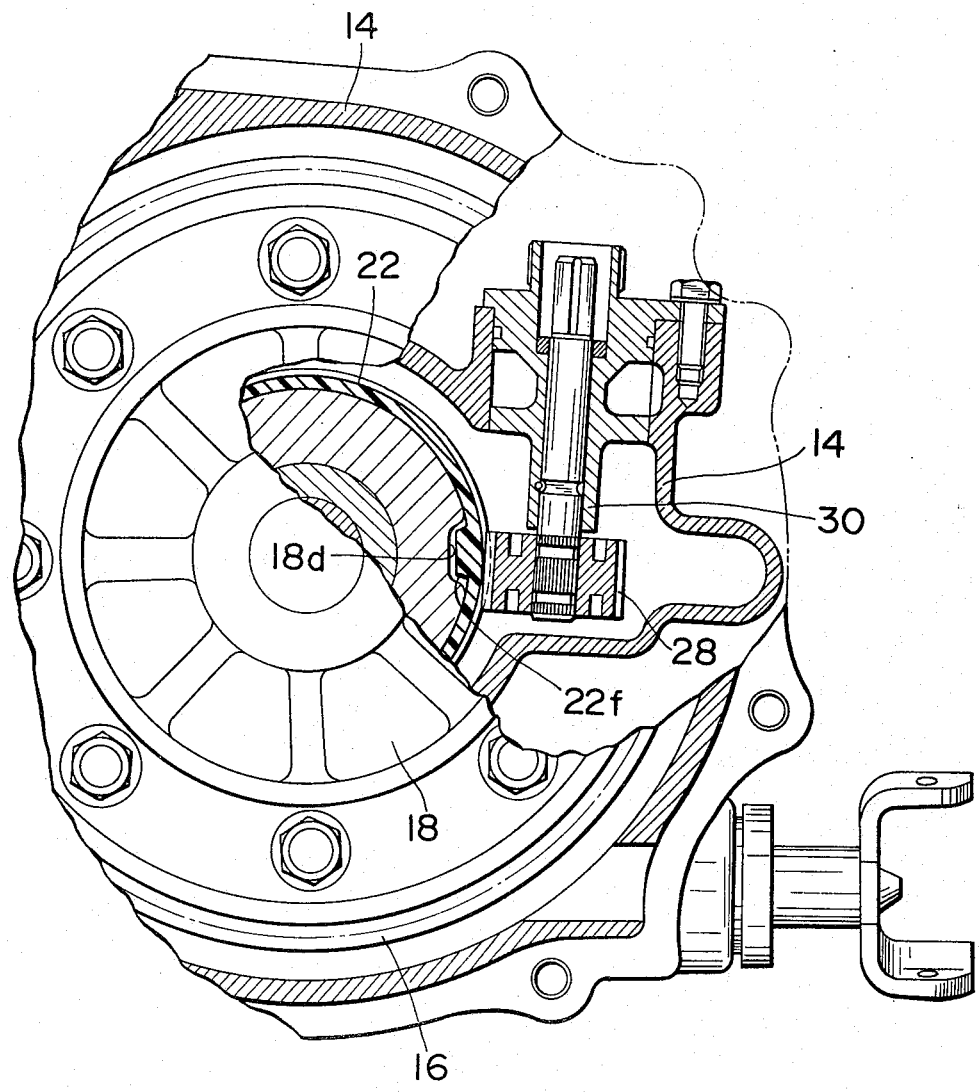

Referring first to FIGS. 1 and 2, a transaxle is generally indicated at 10 and shown to comprise a differential mechanism 12 disposed within a transmission case 14. The transaxle 10 is of the type adapted for application to front wheel drive vehicles, and the differential mechanism 12 is combined with a transmission (not shown in the drawing). The differential mechanism 12 has, as usual, a ring gear 16 fixedly attached to a differential case 18.

A speedometer drive gear arrangement of the present invention is generally indicated at 20 and shown to comprise a worm gear 22 made of a synthetic resinous or plastic material. The differential case 18, which constitutes a drive component of the transaxle, has a cylindrical wall portion 18a and a pair of shoulders 18b and 18c at each axial end of the cylindrical wall portion. The worm gear 22 is mounted on the differential case 18 at the cylindrical wall portion 18a thereof.

Figure 3A:
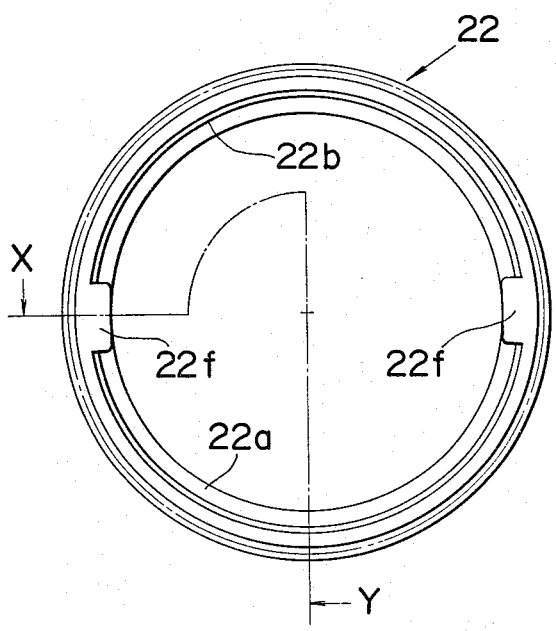
FIG. 3A is an elevational view of a speedometer drive worm gear used in the arrangement of FIGS. 1 and 2.
Figure 3B:
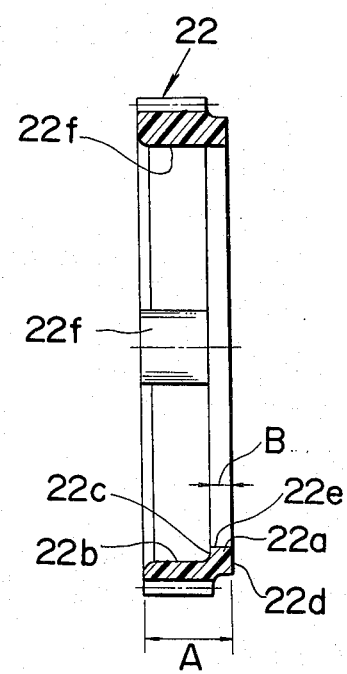
FIG. 3B is a sectional view taken along the line X-Y of FIG. 3A.
Figure 4:
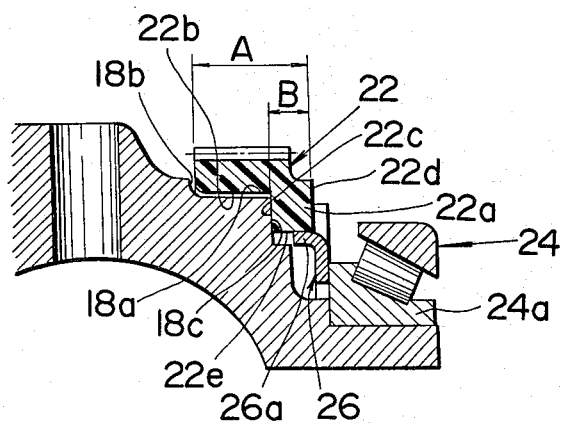
FIG. 4 is a fragmentary enlarged view of the speedometer drive worm gear arrangement of FIGS. 1 and 2.
Figure 5:
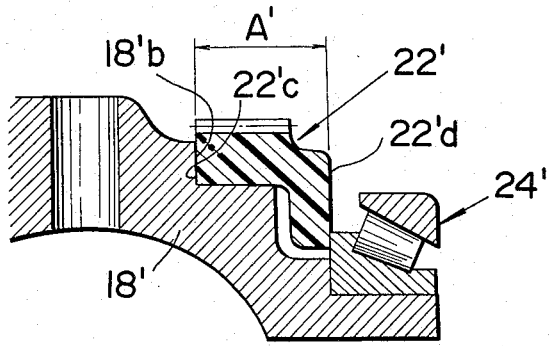
FIG. 5 is a view similar to FIG. 4, but shows a prior art speedometer drive gear arrangement in transaxle.

Referring to FIGS. 3A, 3B and 4 in addition, the worm gear 22 is formed with an annular projection or inward flange 22a projecting radially inwardly from the inner circumferential wall 22b. The inward flange 22a is located at one axial end of the worm gear 22 and shaped to have the thickness B which is considerably smaller than the overall thickness A of the worm gear 22. That is, the inward flange 22a is shaped to be as thinner as possible so long as it retains a necessary strength for the reason as will be understood as the description proceeds.

The inward flange 22a of the worm gear 22 has opposed side surfaces, i.e., an inside surface 22c and outside surface 22d. The inside surface 22c is directly engaged with the shoulder 18c of the differential case 18 whilst the outside surface 22d indirectly with the inner race 24a of a differential case bearing 24 via a stopper 26. The stopper 26 is in the form of a thin, generally flat, annular plate and has a plurality of integral fingers 26a, four for instance, which are arranged in a circular array to engage the flange 22a at the inner circumferential wall 22e thereof. The stopper 26 is thus held radially of the transmission case 18 by the worm gear 22. The stopper 26 also abuttingly engages at the opposed side surfaces with the outer side surace 22d of the flange 22a and the inner race of the bearing 24, respectively. The stopper 26, bearing 24 and differential case shoulder 18c are thus adapted to cooperate with the inward flange 22a to hold the worm gear 22 axially in place relative to the differential case 18.

As clearly seen from FIG. 4, a clearance is provided between the inner circumferential wall 22b and the cylindrical wall portion 18a of the differential case 18 and also between the differential case shoulder 18b and the end of the worm gear 22 adjacent thereto. The clearance is effective particularly for compensating the large amount of contraction of the worm gear 22 as compared with that of the cooperating part of the differential case 18 and thereby preventing distortion and breakage of the worm gear.

A speedometer drive pinion 28 is mounted on a shaft 30 and brought into mesh with the worm gear 22. The worm gear 22 is connected through these pinion 28 and shaft 30 and further through a cable, though not shown, to an automotive speedometer for driving same. In this connection, the pinion 28 and shaft 30 are arranged so that there is substantially no backlash between the worm gear 22 and the pinion 28. With this structure, the provision of the foregoing clearance does not cause any problem but the worm gear 22 is assuredly held in place for correct mesh with the pinion 28 irrespectively of the variation of the temperature.

In FIGS. 2, 3A and 3B, designated by the reference character 22f is a key-like projection integrally formed with the worm gear 22. There are provided two of the key-like projections 22f and they are received in the corresponding keyways 18d formed in the cylindrical wall portion 18a of the differential case 18. With this structure, the relative rotation between the worm gear 22 and the differential case 18 is prevented, enabling the worm gear 22 to rotate in response to the rotation of the differential case 18 in spite of the existence of the above-mentioned clearance.

From the foregoing, it is to be understood that the speedometer drive gear arrangement of the present invention is free from the foregoing distortion or looseness since the worm gear 22 is axially guided at the inward flange 22a whose thickness B is considerably smaller than the overall thickness A and further since the worm gear 22 is not fixedly attached to the differential case 18 but there is provided a clearance between the mating walls of the worm gear 22 and the differential case 18 except for the part where the worm gear 22 is brought into mesh with the pinion 28.

Obviously, many variations and modifications of the present invention are possible in light of the above teachings. It is, therefore, to be understood that within the scope of the appended claims, the invention may be practiced otherwise than as specifically described.

What is claimed is:

1. A speedometer drive gear arrangement in a transaxle, comprising:
    a metallic drive component of said transaxle;
    a plastic worm gear loosely mounted on said drive component and having an inward flange of thickness B considerably smaller than an overall thickness A of said worm gear;
    means for interlocking said worm gear to said drive component so that the worm gear is axially movable but non-rotatable relative to the drive component; and
    locating means for locating said worm gear axially in place relative to said drive component by engaging said inward flange at opposed side surfaces thereof with said drive component.

2. A speedometer drive gear arrangement as set forth in claim 1, wherein said inward flange is located at one axial end of said worm gear.

3. A speedometer drive worm gear arrangement as set forth in claim 1, wherein said drive component includes a differential case having a generally cylindrical wall portion on which said worm gear is mounted.

4. A speedometer drive gear arrangement as set forth in claim 3, wherein said worm gear includes an inner generally circumferential wall extending axially from the flange and configured relative to said differential case cylindrical wall portion to provide a clearance therebetween to compensate for a difference to contraction between said worm gear and said drive component.

5. A speedometer drive gear arrangement as set forth in claim 3, wherein said locating means includes a shoulder formed in said differential case at one axial end of said cylindrical wall portion, one of said inward flange side surfaces being abuttingly engaged with said shoulder, a bearing having an inner race and rotatably supporting said differential case within said transaxle, and a stopper interposed between said worm gear and said bearing in a manner to abuttingly engage the other inward flange side surface with said inner race of said bearing.

6. A speedometer drive gear arrangement as set forth in claim 5, wherein said stopper is in the form of a thin, generally flat, annular plate having a plurality of integral fingers arranged in a circular array to engage said flange at an inner circumferential wall thereof, said stopper also having opposed side surfaces engaging with said other inward flange side surface and said bearing inner race, respectively.

7. A speedometer drive gear arrangement as set forth in claim 3, wherein said interlocking means comprises at least one keyway formed in said differential case cylindrical wall portion and at least one key-like projection received in said keyway and integrally formed an said worm gear.

8. A speedometer drive gear arrangement as set forth in claim 4, further comprising a speedometer drive pinion arranged to mesh with said worm gear in a manner to prevent backlash between the worm gear and pinion.

9. A speedometer drive gear arrangement in a transaxle, comprising:
    a. a differential case having a generally cylindrical wall portion;
    b. a plastic worm gear mounted on said differential case and having an inward flange of a thickness smaller than an overall thickness of said worm gear;
    c. means for interlocking said worm gear and said drive component so that the worm gear is axially movable but non-rotatable relative to the differential case; and
    d. means for locating said worm gear axially in place relative to the differential case by engaging said inward flange at opposed side surfaces thereof with the differential case, said locating means including a shoulder formed in the differential case at one axial end of said cylindrical wall portion, one of said inward flange side surfaces abuttingly engaging said shoulder; a bearing having an inner race and rotatably supporting said differential case within said transaxle; and a stopper interposed between said worm gear and said bearing in a manner to abuttingly engage the other inward flange side surface with said inner race of said bearing, wherein said stopper is a thin, generally flat annular plate having a plurality of integral fingers arranged in a circular array to engage said flange at an inner circumferential wall thereof, said stopper also having opposed side surfaces engaging with said other inward flange side surface and the bearing inner surface respectively.

10. A speedometer drive gear arrangement in a transaxle, comprising:
 a. a drive component of said transaxle;
 b. a plastic worm gear mounted on said drive component;
 c. means for interlocking said worm gear and said drive component so that the worm gear is axially movable but non-rotatable relative to the drive component; and
 d. a stopper plate interposed immediately adjacent and in contact with said worm gear to retain the worm gear in operative engagement with the drive component;
wherein said worm gear includes a generally cylindrical inner circumferential wall extending axially along a major portion of the gear and facing a corresponding wall of the drive component, said circumferential walls defining a clearance therebetween to compensate for difference in contraction between said worm gear and said drive component.

* * * * *